United States Patent Office 3,282,591
Patented Nov. 1, 1966

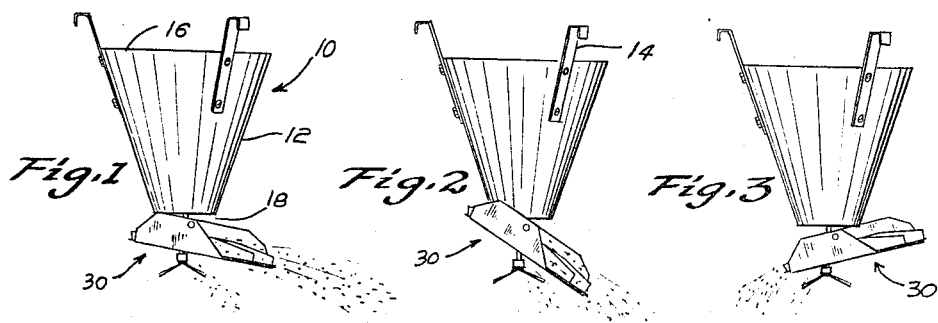
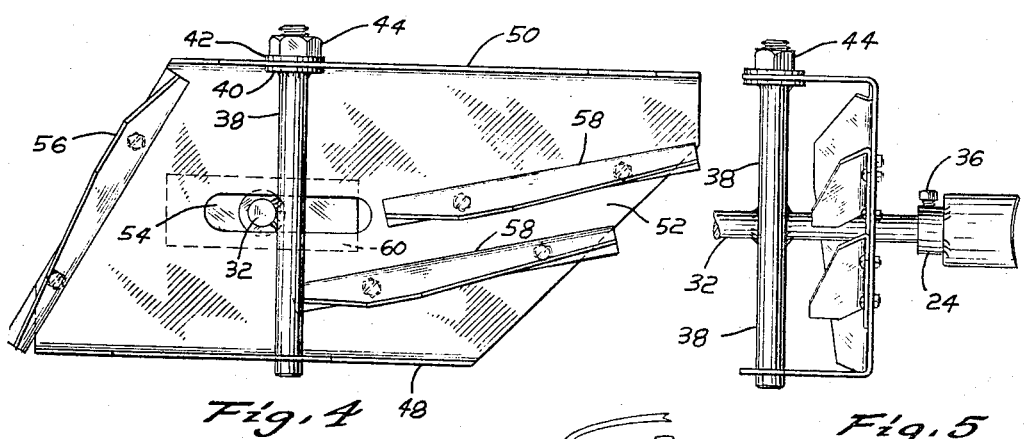
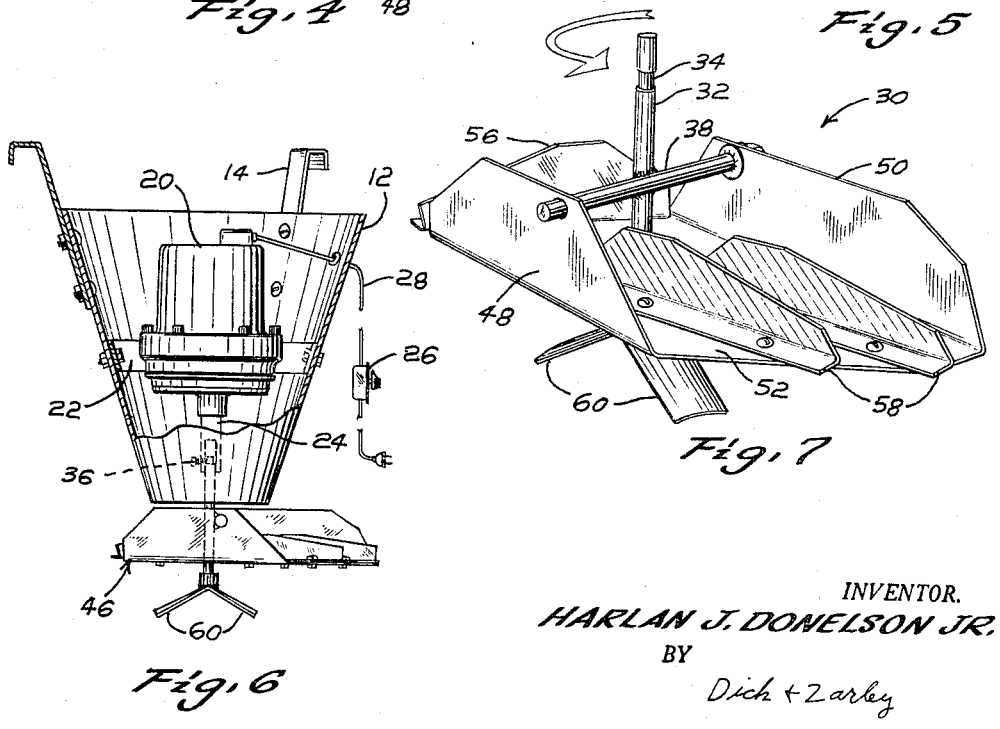

3,282,591
MATERIAL SPREADER
Harlan J. Donelson, Jr., W. Highway 330,
Marshalltown, Iowa
Filed July 8, 1964, Ser. No. 381,115
9 Claims. (Cl. 275—15)

This invention relates to a material spreader and in particular to a spreader assembly which is provided with means for varying the distribution of the material being discharged.

It is one of the objects of this invention to provide a material spreader which may be mounted in the top inlet end of a grainery or the like for distributing the grain uniformly throughout the storage area in the grainery.

It is a further object of this invention to provide a material spreader wherein the pattern of grain distribution is varied as the power means speed in varied.

A still further object of this invention is to provide a material spreader having a scattering assembly pivotally mounted to a rotating shaft and means is provided to vary the angular relationship between the scattering assembly and the rotating shaft to provide the desired material distribution pattern.

Another object of this invention is to provide a material spreader having a scattering assembly pivotally mounted on a rotating shaft wherein a distributing means is provided on the bottom end of the rotating shaft below the pivotal spreader assembly.

A further object of this invention is to provide a material spreader which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

FIGS. 1 through 3 illustrate the material spreader and the scattering assembly in three different angular positions relative to the vertical axis of the rotating shaft on which the scattering assembly is mounted;

FIG. 4 is a top plan view of the scattering assembly only;

FIG. 5 is an end elevation view of the scattering assembly of FIG. 4 as viewed from the end to the right;

FIG. 6 is a fragmentary elevation view of the material spreader with a portion of the funnel unit broken away to illustrate the relative position of the power means for driving the scattering assembly; and FIG. 7 is a perspective view of the scattering assembly removed from the material spreader.

The material spreader of this invention is referred to generally by the reference numeral 10 and includes a funnel-shaped conduit 12 having support arms 14 provided along its upper peripheral edge for detachable mounting in the inlet end of a grainery or the like. The funnel-shaped conduit 12 is arranged at its normal position with its enlarged inlet end 16 extending upwardly and its reduced in diameter outlet end 18 extending downwardly.

An electrical motor 20 is supported centrally within the funnel 12 by appropriate elements (not shown) extending to a support ring 22 connected to the inner side wall of the funnel 12. A shaft 24 extends downwardly from the motor 20 and may be operated at variable speeds by a rheostat switch 26 in the power line 28.

A scattering assembly 30 is positioned under the outlet end 18 of the funnel conduit 12 and includes a shaft 32 having an annular recess 34 for detachable locking engagement with the motor shaft 24. Locking means 36 is provided for engagement with the annular recess 34. Intermediate the ends of the shaft 32, a transversely extending pin member 38 is provided having a pair of washer-like elements 40 and 42 at one end. The washer element 40 is welded or otherwise suitably secured to the pin 38 while the washer 42 is held thereon by a threaded nut 44.

A scattering assembly 30 also includes a channel-shaped member 46 having a pair of side walls 48 and 50 and a bottom wall 52. The side walls 48 and 50 are provided with aligned apertures along their upper longitudinal edges for receiving the pin 38. The bottom wall 52 is provided with an elongated slot 54 extending longitudinally thereof for receiving the lower end of the shaft 32 thereby permitting the channel member 46 to pivot on the pin 38 relative to the shaft 32.

As illustrated in FIG. 7, a closure plate element 56 is provided across one end of the channel member 46 while the other end remains open but is provided with a pair of L-shaped deflector fins 58 bolted to the bottom wall 52 and extending generally longitudinally of the channel member 46. The side walls 48 and 50, particularly the side wall 50 are connected to the pin 38 at points offset from their transverse center axis. The bottom wall 52 has opposite end edges which extend diagonally relative to the side walls 48 and 50. The one end wall 56 is disposed along the diagonal adjacent end edge of the bottom wall 52.

Beneath the bottom wall 52, a pair of paddle members 60 are fixedly secured to the end of the shaft 32 and extend diametrically opposite each other and downwardly from the bottom wall 52.

In operation it is seen from FIGS. 1 through 3 that the angular position of the scattering plate assembly 30 is changed as desired by loosening the nut 44 from locking engagement with the washer 42. The scattering plate assembly may be positioned with its open end extending downwardly as illustrated in FIGS. 1 and 2 or upwardly as in FIG. 3. The higher the open end of the scattering plate assembly 30, the farther the grain will be thrown as the assembly rotates. When the open end extends upwardly the material is discharged from the opposite end of the channel 46 past the end wall 56.

The grain which falls through the elongated slot 54 is distributed therebelow by the paddles 60. The scattering plate assembly 30 may be easily secured to and removed from the motor 20 by simply removing the pin 36 from the annular recess 34 in the shaft 32. Moreover, the pin 38 extending between the side walls 48 and 50 of the channel 46 may be easily removed therefrom by removal of the nut 44 thereby permitting separation of the ends of the pin 38 from the side walls 48 and 50. It is noted that the end of the pin 38 in engagement with the side wall 48 is loosely held in the hole in the side wall 48 and may move relative thereto longitudinally in opposite directions.

Some changes may be made in the construction and arrangement of my material spreader without departing from the real spirit and purpose of my invention, and it is my intention to cover by my claims, any modified forms of structure or use of mechanical equivalents which may be reasonably included within their scope.

I claim:
1. In a spreader assembly,
   a funnel unit having an inlet and an outlet opening,
   a shaft means positioned in said funnel and extending from said outlet opening,
   a power means secured to said shaft means to cause its rotation, and
   a scattering assembly positioned at the outlet opening of said funnel, said scattering assembly including a channel shaped member open at at least one end and having a transversely extending element rotatably se- cured to the side walls of said channel member, said element being fixedly secured to said shaft means and the bottom wall of said channel member having a slot extending longitudinally thereof and said shaft extending through said slot.

2. On a spreader assembly,
a funnel unit having an inlet and an outlet opening,
a shaft means positioned in said funnel and extending from said outlet opening,
a power means secured to said shaft means to cause its rotation, and
a scattering assembly positioned at the outlet opening of said funnel, said scattering assembly including a channel shaped member open at at least one end and having a transversely extending element rotatably secured to the side walls of said channel member, said element being fixedly secured to said shaft means, the bottom wall of said channel member having a slot extending longitudinally thereof, and said shaft means extending through said slot, a distributing means on said shaft means on the opposite side of said bottom wall from said side walls.

3. The spreader assembly of claim 2 wherein said scattering assembly is further defined as having deflector elements arranged in spaced relationship to each other and disposed longitudinally of said channel member and secured to said bottom wall adjacent said open end.

4. The spreader assembly of claim 2 wherein said scattering assembly is further defined as having deflector elements L-shaped in cross-section arranged in spaced relationship to each other and disposed longitudinally of said channel member and secured to said bottom wall adjacent said open end.

5. In a spreader assembly,
a conduit vertically positioned and having an upper inlet opening and a lower outlet opening,
a vertically disposed shaft in said conduit extending downwardly from said outlet end,
a power means for rotating said shaft,
means for selectively varying the speed of shaft rotation,
a scattering assembly positioned at the outlet opening of said conduit, said scattering assembly including an elongated channel member having a bottom wall having an elongated slot extending longitudinally thereof, a pin element extending transversely between said side walls and rotatably secured thereto, said pin being spaced above and over said slot, said shaft means received in said slot and extending therethrough, said pin means being fixedly secured at its center area to said shaft means; and a distributing means on said shaft means below said bottom wall.

6. The spreader assembly of claim 5 wherein means is provided for selectively locking said channel member on said pin means whereby said channel member may be positioned at the desired angle relative to said shaft to vary the distribution of material from said channel member.

7. The spreader assembly of claim 5 wherein said power means is positioned in said conduit and said shaft is detachably secured thereto to permit said spreader assembly to be readily removed from said spreader assembly.

8. The spreader assembly of claim 5 wherein a shoulder is formed on said pin adjacent one of said side walls and a locking element is provided on the other side of said one side wall to selectively clamp said one side wall.

9. The spreader assembly of claim 5 wherein a shoulder is formed on said pin adjacent one of said side walls and a locking element is provided on the other side of said one side wall to selectively clamp said one side wall, and the end of said pin opposite said locking element being loosely mounted in an opening in said other side wall for longitudinal movement in opposite directions.

References Cited by the Examiner
UNITED STATES PATENTS

| | | | |
|---|---|---|---|
| 2,557,977 | 6/1951 | Knoff | 214—17 X |
| 3,013,695 | 12/1961 | Caldwell | 275—14 X |
| 3,064,833 | 11/1962 | Von Ruden | —275—15 X |
| 3,175,668 | 4/1965 | Stolzfus | 214—17 X |

ABRAHAM G. STONE, *Primary Examiner.*

JIMMIE R. OAKS, *Assistant Examiner.*